United States Patent
Sun et al.

(10) Patent No.: US 12,118,888 B2
(45) Date of Patent: Oct. 15, 2024

(54) METHOD FOR INFORMING OTHER ROAD USERS IN THE SURROUNDINGS OF AN EGO VEHICLE DURING PARKING

(71) Applicant: Continental Teves AG & Co. OHG, Frankfurt am Main (DE)

(72) Inventors: Yongjiang Sun, Darmstadt (DE); Attila Jaeger, Darmstadt (DE); Timo Hamm, Büttelborn (DE); Amin Jeribi, Darmstadt (DE); Harald Feifel, Darmstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 213 days.

(21) Appl. No.: 17/635,472

(22) PCT Filed: Aug. 10, 2020

(86) PCT No.: PCT/DE2020/200068
§ 371 (c)(1),
(2) Date: Feb. 15, 2022

(87) PCT Pub. No.: WO2021/027997
PCT Pub. Date: Feb. 18, 2021

(65) Prior Publication Data
US 2022/0292975 A1    Sep. 15, 2022

(30) Foreign Application Priority Data
Aug. 15, 2019   (DE) ..................... 10 2019 212 258.2

(51) Int. Cl.
G08G 1/16    (2006.01)
G08G 1/14    (2006.01)

(52) U.S. Cl.
CPC ............. *G08G 1/162* (2013.01); *G08G 1/146* (2013.01); *G08G 1/168* (2013.01)

(58) Field of Classification Search
CPC ........ G08G 1/162; G08G 1/146; G08G 1/168; G08G 1/0965; G06V 20/586
See application file for complete search history.

(56) References Cited

U.S. PATENT DOCUMENTS

| | | | |
|---|---|---|---|
| 9,959,760 B2* | 5/2018 | Baasch | ................... G08G 1/147 |
| 11,242,051 B1* | 2/2022 | Konrardy | ......... G08G 1/096791 |
| 2008/0129544 A1 | 6/2008 | Augst | |

(Continued)

FOREIGN PATENT DOCUMENTS

| DE | 102004062021 A1 | 7/2006 |
|---|---|---|
| DE | 102008024964 A1 | 11/2009 |

(Continued)

OTHER PUBLICATIONS

Machine Translation of EP 1916154 A1 (Year: 2008).*

(Continued)

*Primary Examiner* — James J Lee
*Assistant Examiner* — Alexander George Matta

(57) ABSTRACT

Upon initiating an automated parking space search and/or an at least partly automated parking process, an ego vehicle automatically provides information on at least its current position, initiation of the automated parking space search and/or a parking process, including a parking safety zone that it requires for parking, to other road users in the surroundings of the ego vehicle.

10 Claims, 1 Drawing Sheet

(56) References Cited

U.S. PATENT DOCUMENTS

2011/0043380 A1    2/2011  Bammert et al.
2013/0054089 A1    2/2013  Nordbruch et al.
2019/0299981 A1*  10/2019  Yoon .................... B60W 30/09

FOREIGN PATENT DOCUMENTS

| DE | 102009028024 A1 | 2/2011 | | |
|----|-----------------|--------|---|---|
| DE | 102011003886 A1 | 8/2012 | | |
| DE | 102011081394 B3 | 10/2012 | | |
| DE | 102012219572 A1 | 4/2014 | | |
| DE | 102014009627 A1 | 11/2014 | | |
| DE | 102014219876 A1 | 4/2016 | | |
| DE | 102015011547 A1 | 5/2016 | | |
| DE | 102015115240 A1 | 3/2017 | | |
| DE | 102018206042 A1 | 10/2019 | | |
| EP | 1916154 A1 * | 4/2008 | ............. | B60Q 1/484 |
| EP | 1916177 A2 | 4/2008 | | |

OTHER PUBLICATIONS

Search Report dated Jul. 6, 2020 from corresponding German patent application No. DE 10 2019 212 258.2.
International Search Report and Written Opinion dated Nov. 6, 2020 from corresponding International patent application No. PCT/DE2020/200068.
Office Action dated Apr. 27, 2023 from corresponding Chinese Patent Application No. 202080053563.0.
Chinese Notice of Second Office Action dated Nov. 7, 2023 for the counterpart Chinese Patent Application No. 202080053563.0 and translation of same.

* cited by examiner

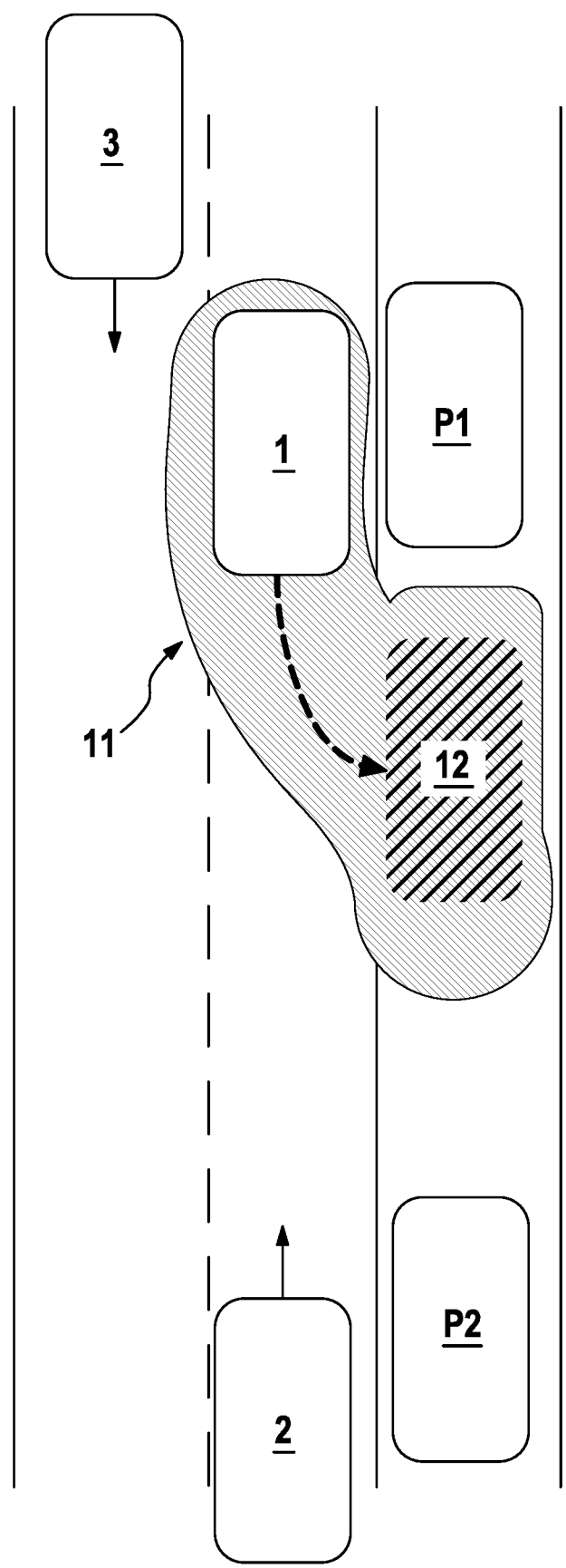

METHOD FOR INFORMING OTHER ROAD USERS IN THE SURROUNDINGS OF AN EGO VEHICLE DURING PARKING

BACKGROUND

The invention relates to a method for informing other road users in the surroundings of an ego vehicle during the automated search and/or the at least partly automated parking.

A plurality of applications already deals with the automated search and/or the at least partly automated parking of an ego vehicle. However, the practical utilization of such applications in real road traffic often fails due to the potential, at least, of other road users crossing the required traffic space, i.e., the possibility of vehicles crossing and the associated risk of collision cannot be excluded, and therefore it frequently has to be aborted.

DE 10 2014 009 627 A1 discloses, for example, a method for reporting a free parking space which is recognized by an ego vehicle and a report about the free parking space is provided for further different vehicles, at least if the report about the free parking space is deemed to be useful. If applicable, the report about the free parking space can be linked to limited information on the free parking space and the coupled information can be provided to further vehicles searching for parking spaces.

DE 102009028024 A1 similarly describes a parking guidance system for navigating a vehicle searching for a parking space to a free parking space, wherein information on available, free parking spaces is investigated by vehicles in traffic, the information is transmitted directly to the vehicle searching for a parking space or indirectly via a central system to the vehicle searching for a parking space.

BRIEF SUMMARY

The object of the present invention is to further increase safety in road traffic, especially when searching for a parking space or parking, and to make the application of an automated search and/or the at least partly automated parking safer and to reduce obstructions or even abortions caused by other road users.

This object is achieved by the features of the independent claims. Advantageous further developments of the invention are set out in the subclaims, wherein combinations and further developments of individual features with one another are also conceivable.

A fundamental concept of the invention is that other road users in the surroundings of an ego vehicle are informed upon initiating the automated parking space search and/or an at least partly automated parking process. The ego vehicle automatically provides information on at least its current position and the initiation of the automated parking space search and/or a parking process to other road users in the surroundings of an ego vehicle.

In preferred further developments, the direction is, for example, additionally transmitted to the parking space search and/or the parking process, or a parking safety zone is notified, which the ego vehicle needs at least during the process and which it preferably reserves for itself during the parking space search and/or the parking process.

The parking safety zone is preferably larger than the parking area actually needed by the ego vehicle, that is to say it is not only determined from the parking area itself, which is recognized as being sufficient for the ego vehicle, but also includes the driving path which is needed to park. The aim is to avoid not only the actual parking area being occupied in the meantime by another road user, but also the required parking space being blocked—even if only temporarily—or the danger of a collision. A predefined safety reserve and the actual parking space are also preferably included.

The reservation made for the parking safety zone is preferably revoked as soon as the vehicle has parked.

The information can be provided to other road users directly, for example via an ad hoc network, or indirectly by transferring the information to a network service provider.

Accordingly, a motor vehicle having sensors for detecting a parking space, a communication device for informing other road users and/or network service providers, and a control unit having a program for performing the method are also claimed according to any one of the preceding claims.

The invention is explained in greater detail below by means of exemplary embodiments with reference to the figures.

BRIEF DESCRIPTION OF THE DRAWINGS

FIG. 1 shows an ego vehicle on a road having a relatively narrow lane and to the left thereof the lane for the opposite direction of travel and to the right thereof a parking lane.

DETAILED DESCRIPTION

FIG. 1 shows the ego vehicle (1) on a road having a relatively narrow lane and to the left thereof the lane for the opposite direction of travel and to the right thereof a parking lane. The vehicle (1) has recognized the parking space, which is depicted in a hatched manner here, on passing and has stopped next to the parked vehicle (P1) and established the parking safety zone (11) it requires for parking (which is depicted in black here and only sketchily, without any claim to technical correctness).

With the decision regarding the planned initiation of the at least partly automated parking process, the ego vehicle (1) automatically provides information on at least its current position and the at least planned initiation of the parking process to other road users in the surroundings of an ego vehicle. The direction is preferably additionally transmitted to the parking space search and/or the parking process, in particular in the form of a parking safety zone (11) which the ego vehicle (1) needs at least during the parking process. The parking safety zone (11) is preferably reserved for the ego vehicle (1) with respect to the other road users, for example by means of a corresponding confirmation from the other vehicles or from a network service provider.

The parking safety zone (11) is preferably larger than the parking area actually needed by the ego vehicle (12), which is depicted here in a hatched manner. Indeed, the parking safety zone (11) also extends to the opposite carriageway, for example, if the carriageway is narrow and the vehicle has to swing out.

This information is sent to other road users (2, 3) directly, for example via an ad hoc network, such as V2X or the like, or indirectly by transferring the information to a network service provider. It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which is therefore to be distinguished from other solutions which, for example, are based on a mobile network. For example, vehicle-to-X communication can take place using the standards IEEE 802.11p or IEEE 1609.4.

Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, for example, a mobile network.

If the vehicle 2 receives this information, it can be both prevented that the vehicle 2 approaches the parking safety zone (11) so quickly and so closely that the ego vehicle (1) has to abort the parking process in order to avoid a potential risk of collision. In addition, not only is the actual parking area (12) in front of the vehicle (2), which is possibly also searching for a parking space, reserved by the parking safety zone (11), but the vehicle (2) is also restricted by the parking safety zone (11), beyond the parking area (12), from entering the parking safety zone (11), for example in order to park in the space which does of course remain per se between the parking area (12) and the further parked vehicle (P2).

If, in addition, the vehicle (3) on the opposite carriageway likewise receives the information on the parking safety zone (11), the fact that the ego vehicle has to swing out onto the opposite carriageway for a short period of time means that the vehicle (3) is asked or requested to reduce its speed to such an extent or to stop for a short time until the vehicle (1) has left the critical traffic space. The ego vehicle (1) simply transmitting the information regarding the intention to park on the parking area (12) would not have made this particularly preferred embodiment possible.

In order to ensure optimal usage and to not hinder the flow of traffic for unnecessarily long periods, the reservation made for the parking safety zone (11) is revoked as soon as the vehicle (1) has parked. In a particularly advantageous embodiment, regions of the safety zone which have already been utilized and are now no longer needed can already be dynamically released again prior to completion of the parking, or the safety zone can be continuously updated. Thus, a reservation of the opposite carriageway which is needed for swinging into a parking space can, for example, already be revoked after leaving said lane and, therefore, significantly before the end of the parking process, and the opposite carriageway can be released, that is to say before the ego vehicle has reached its actual parking position.

Similarly, this method can also already be applied to the automated search for a parking space, wherein the form of the parking safety zone (11) can and is designed in a correspondingly deviating manner, in particular as long as the ego vehicle (1) is still moving forward.

By activating the method, however, an increased safety distance is required with respect to the following vehicle (2) in order to then implement the corresponding form of the parking safety zone (11) for the parking when the parking space is recognized.

As already set out above, parking aids are thus already offered by many vehicle manufacturers. As a general rule, the vehicle searches for a suitable parking space at the edge of the road at low speed. Following a confirmation by the driver (e.g., by engaging reverse gear), the vehicle drives itself into the gap. The driver pays attention to the environment, keeping his foot on the brake pedal. In the near future, parking will be automated even further, e.g., the monitoring will be entrusted to the environment sensors. On roads with little traffic, the driver can use such a parking aid without stress. Sufficient space is available, both in front of and behind the vehicle.

However, in heavy traffic, e.g., on main roads, few drivers dare to use the parking aid. In addition, a suitable gap is often only found after the vehicle searching for a parking space has driven a car's length past the car. Often, however, a following vehicle is already too close behind the vehicle wishing to park. If the following vehicle cannot immediately take evasive action, the vehicle wanting to park must abort the parking process and continue to search elsewhere.

The aim of the solution proposed here is to inform road users in the environment, that is to say following vehicles and any oncoming vehicles, at an early stage upon initiating the automated parking space search and/or an at least partly automated parking process the ego vehicle (1), for example via V2X messages. The information regarding searching for a parking space and, if applicable, the location of the target parking space is sent or forwarded to vehicles in the nearby surroundings. Vehicles which are equipped with V2X technology can receive these messages and e.g., display them to the driver or be considered in autonomous driving maneuvers. The following vehicles are thus asked to keep their distance and drive slowly. Oncoming vehicles are thus requested to drive slowly, as the parking vehicle could possibly affect the neighboring lane for a brief period.

If necessary, vehicles which, based on their own track calculation, would intersect the parking safety zone are to adjust their speed or to stop sufficiently far in front of the target parking space or parking safety zone.

The invention claimed is:

1. A method for informing, by V2X communication, other road users in the surroundings of an ego vehicle, wherein, upon initiating an automated parking space search and/or an at least partly automated parking process, the ego vehicle automatically provides information on at least a current position of the ego vehicle and the initiation of the automated parking space search and/or a parking process to other road users in the surroundings of the ego vehicle, wherein the other road users are notified of a parking safety zone, which the ego vehicle needs at least during the automated parking process and which the ego vehicle reserves for itself during the parking space search and/or the automated parking process, wherein the parking safety zone includes the ego vehicle's current location, a driving path for moving, in reverse, from the ego vehicle's current position to a parallel-parking parking area to thereby avoid the parallel-parking parking area from being occupied in the meantime by another road user and to avoid the ego vehicle's path to the parallel-parking parking area from being blocked by another road user.

2. The method according to claim 1, wherein the reservation made for the parking safety zone is revoked as soon as the vehicle has parked.

3. The method according to claim 2, wherein the parking safety zone is already adapted during the parking and the reservation is revoked for areas which are no longer needed.

4. The method according to claim 3, wherein the information is provided to other road users directly by V2X communication or indirectly by transferring the information to a network service provider.

5. The method according to claim 1, wherein the parking safety zone extends into a lane of traffic for travel in an opposite direction than a direction of travel of a lane in which the ego vehicle is located to account for the ego vehicle having to swing out into the lane of traffic for travel in an opposite direction while travelling from the ego vehicle's current position to the parking area.

6. A motor vehicle having sensors for detecting a parking space, a V2X communication device for informing other road users and/or network service providers, and an automotive electronic control unit having a program for performing operations comprising: automatically providing information on at least a current position of the motor vehicle and the initiation of the automated parking space search and/or a parking process to other road users in the surroundings of the motor vehicle, wherein the other road users are notified of a parking safety zone, which the motor vehicle needs at least during the automated parking process and which the motor vehicle reserves for itself during the parking space search and/or the automated parking process, wherein the parking safety zone includes the motor vehicle's current location, a driving path for moving in reverse, from the motor vehicle's current position to a parallel-parking parking area to thereby avoid the parallel-parking parking area from being occupied in the meantime by another road user and to avoid the motor vehicle's path to the parallel-parking parking area from being blocked by another road user.

7. The motor vehicle according to claim 6, wherein the reservation made for the parking safety zone is revoked as soon as the motor vehicle has parked.

8. The motor vehicle according to claim 7, wherein the parking safety zone is already adapted during the parking and the reservation is revoked for areas which are no longer needed.

9. The motor vehicle according to claim 8, wherein the information is provided to other road users directly by V2X communication or indirectly by transferring the information to a network service provider.

10. The motor vehicle according to claim 6, wherein the parking safety zone extends into a lane of traffic for travel in an opposite direction than a direction of travel of a lane in which the motor vehicle is located to account for the motor vehicle having to swing out into the lane of traffic for travel in an opposite direction while travelling from the motor vehicle's current position to the parking area.

* * * * *